United States Patent
Bardella et al.

(10) Patent No.: US 12,248,190 B2
(45) Date of Patent: Mar. 11, 2025

(54) BIASED CONNECTOR SYSTEM

(71) Applicant: Molex, LLC, Lisle, IL (US)

(72) Inventors: Gianni Ryan Bardella, Maumelle, AR (US); Dominic Steier, Naperville, IL (US)

(73) Assignee: Molex, LLC, Lisle, IL (US)

( * ) Notice: Subject to any disclaimer, the term of this patent is extended or adjusted under 35 U.S.C. 154(b) by 88 days.

(21) Appl. No.: 18/079,042

(22) Filed: Dec. 12, 2022

(65) Prior Publication Data

US 2023/0185039 A1    Jun. 15, 2023

Related U.S. Application Data

(60) Provisional application No. 63/288,647, filed on Dec. 12, 2021.

(51) Int. Cl.
*H04B 10/00*      (2013.01)
*G02B 6/42*      (2006.01)

(52) U.S. Cl.
CPC ......... *G02B 6/4284* (2013.01); *G02B 6/4245* (2013.01); *G02B 6/4261* (2013.01); *G02B 6/428* (2013.01)

(58) Field of Classification Search
CPC .. G02B 6/4284; G02B 6/4245; G02B 6/4261; G02B 6/428; H01R 13/42; H01R 13/10; H01R 13/639; H01R 12/7064; H01R 13/2407
See application file for complete search history.

(56) References Cited

U.S. PATENT DOCUMENTS

| | | | | |
|---|---|---|---|---|
| 6,074,228 A * | 6/2000 | Berg | ............. | H05K 1/117 385/75 |
| 6,142,802 A * | 11/2000 | Berg | ............. | H01R 13/2442 439/924.1 |
| 6,304,436 B1 * | 10/2001 | Branch | ............. | G02B 6/4292 361/753 |
| 6,524,134 B2 * | 2/2003 | Flickinger | ............. | H05K 9/0058 439/607.2 |
| 6,648,693 B1 * | 11/2003 | Hogan | ............. | H01R 13/193 439/923 |
| 6,816,376 B2 * | 11/2004 | Bright | ............. | G02B 6/4201 165/185 |
| 6,893,294 B2 * | 5/2005 | Moriyama | ............. | G02B 6/4292 439/607.2 |

(Continued)

FOREIGN PATENT DOCUMENTS

| | | |
|---|---|---|
| TW | 201212429 A | 3/2012 |
| TW | M519337 U | 3/2016 |

*Primary Examiner* — Agustin Bello

(57) ABSTRACT

A biased connector assembly is disclosed that includes a receptacle configured to mount to a substrate and form an electrical connection therewith, and a plug connector. The receptacle includes a cage that defines a port having a connector positioned therein. The connector may include a slot that is aligned with the port. The port includes one or more biasing members positioned therein. The plug connector includes a pluggable transceiver module to be inserted into the port and a card with at least one contact pad configured to engage with a terminal of the connector. The one or more biasing members may bias the plug module away from the connector such that a stub length of the contact pad is within a predetermined range.

20 Claims, 19 Drawing Sheets

(56) References Cited

U.S. PATENT DOCUMENTS

| | | | |
|---|---|---|---|
| 7,044,763 B1* | 5/2006 | Inoue | H01R 12/83 439/326 |
| 7,195,403 B2* | 3/2007 | Oki | G02B 6/4284 385/94 |
| 7,433,193 B2* | 10/2008 | Yee | G02B 6/4246 361/702 |
| 7,727,018 B2* | 6/2010 | Bright | H01R 13/6584 439/607.28 |
| 7,794,241 B2* | 9/2010 | Bright | H01R 12/721 439/59 |
| 7,833,068 B2* | 11/2010 | Bright | H01R 13/502 439/733.1 |
| 8,057,110 B2* | 11/2011 | Harris | G02B 6/4246 385/94 |
| 8,105,110 B2* | 1/2012 | Hsia | H01R 12/00 439/152 |
| 8,444,437 B2* | 5/2013 | Szczesny | H01R 13/6587 439/607.17 |
| 8,556,658 B2* | 10/2013 | Szczesny | G02B 6/4278 439/607.2 |
| 8,714,839 B2* | 5/2014 | Ito | H01R 13/6581 385/139 |
| 8,911,256 B2* | 12/2014 | Qiao | H01R 13/6581 439/607.18 |
| 9,210,824 B2* | 12/2015 | Chang | H05K 7/10 |
| 10,651,618 B2* | 5/2020 | Wang | H01R 13/64 |
| 11,101,611 B2* | 8/2021 | Winey | H01R 12/75 |
| 2002/0131725 A1* | 9/2002 | Ahrens | G02B 6/426 385/88 |
| 2003/0171033 A1* | 9/2003 | Bright | H01R 13/6594 439/607.25 |
| 2004/0203289 A1* | 10/2004 | Ice | H01R 13/6596 439/607.2 |
| 2008/0299826 A1* | 12/2008 | Cheng | H05K 9/0058 29/874 |
| 2012/0275120 A1* | 11/2012 | Nguyen | G02B 6/4292 361/747 |
| 2013/0034999 A1* | 2/2013 | Szczesny | G02B 6/4278 439/660 |
| 2016/0091670 A1* | 3/2016 | Akieda | G02B 6/4284 385/78 |
| 2017/0005446 A1* | 1/2017 | Regnier | H01R 25/006 |
| 2017/0250479 A1 | 8/2017 | Xie | |
| 2019/0027882 A1* | 1/2019 | Wang | H01R 43/005 |
| 2020/0028302 A1 | 1/2020 | Winey | |
| 2020/0153163 A1* | 5/2020 | Guetig | G02B 6/4277 |
| 2020/0301084 A1* | 9/2020 | Champion | G02B 6/428 |
| 2023/0185039 A1* | 6/2023 | Bardella | G02B 6/4261 385/92 |
| 2024/0113473 A1* | 4/2024 | Chen | H01R 13/6582 |

\* cited by examiner

BIASED CONNECTOR SYSTEM

CROSS-REFERENCE TO RELATED APPLICATION

The present disclosure claims the benefit of and priority to U.S. Provisional Patent Application No. 63/288,647 filed Dec. 12, 2021, entitled "BIASED CONNECTOR SYSTEM," the contents of which being incorporated by reference in its entirety herein.

TECHNICAL FIELD

This disclosure relates to the field of input/output (IO) connectors and, more specifically, to IO connectors suitable for use in high data rate applications.

BACKGROUND

Input/output (IO) connectors are designed with a plug module connector that engages a receptacle. The plug module connector includes a paddle card with contacts that engage terminals in the receptacle connector. At high data rates (such as rates greater than 56 Gbps), existing designs have tolerance stack-up that causes the interface between the plug module connector and the receptacle connector to negatively impact signal integrity performance. Notably, this issue becomes more problematic as data rates increase.

SUMMARY

Various embodiments for a biased connector system, and the components thereof, are described. In a first aspect, a connector assembly is described that includes a receptacle connector configured to mount to a substrate and form an electrical connection therewith, the receptacle connector comprising a cage that defines a port having a connector positioned therein, the connector comprising a card slot that is aligned with the port, the port comprising at least one biasing member positioned therein, the connector comprising at least one terminal with a contact portion positioned in the card slot, and a plug connector comprising a pluggable transceiver module configured to be inserted into the port, the pluggable transceiver module comprising a paddle card with at least one contact pad configured to engage with the contact portion of the at least one terminal, where the at least one biasing member biases the pluggable transceiver module away from the connector so that a stub length of the contact pad is within a predetermined range.

The at least one biasing member may include a first biasing member and a second biasing member, and the first biasing member may be positioned on a first side of the connector and the second biasing member is positioned on a second side of the connector. The first biasing member and the second biasing member may be configured to contact opposing sides of a distal end of the pluggable transceiver module.

The receptacle connector may further include a base plate having a plurality of apertures through which prongs of the cage are positioned to form an electrical connection with the substrate, where the at least one biasing member is formed integral with the base plate and the at least one biasing member extends at least in part vertically from the base plate. The at least one biasing member may include a first C-shaped section extending in an insertion direction and a second C-shaped section integral with the first C-shaped section extending in an opposing direction.

The receptacle connector may further include a plug module stop configured to limit reverse translation of the pluggable transceiver module relative to the receptacle connector. For instance, the plug module stop may include a cage latch formed integral with the cage, the cage latch being configured to engage a housing of the plug connector to limit the reverse translation of the pluggable transceiver module when a force is imposed by the pluggable transceiver by the at least one biasing member.

In a second aspect, a receptacle connector is described that is configured to mount to a substrate and form an electrical connection therewith, the receptacle connector comprising: a cage that defines a port, the port comprising at least one biasing member positioned therein and at least one terminal with a contact portion, where the at least one biasing member is configured to urge a pluggable transceiver module of a plug connector to a predetermined position such that a stub of a contact pad of the plug connector has a predetermined length when engaged with the at least one terminal.

The port may have a connector positioned therein, the connector comprising a card slot that is aligned with the port, where the connector comprises the at least one terminal. In some aspects, the at least one biasing member is a first biasing member and a second biasing member, where the first biasing member is positioned on a first side of the port and the second biasing member is positioned on a second side of the port, and the first biasing member and the second biasing member are configured to contact opposing sides of the pluggable transceiver module.

The receptacle connector may further include a base plate having a plurality of apertures through which prongs of the cage are positioned to form an electrical connection with the substrate, where the at least one biasing member is formed integral with the base plate, and the at least one biasing member extends vertically from the base plate. The at least one biasing member may have an S-shaped body, the S-shaped body comprising a first C-shaped section extending in an insertion direction and a second C-shaped section integral with the first C-shaped section extending in an opposing direction.

The receptacle connector may further include a plug module stop configured to limit reverse translation of the pluggable transceiver module relative to the receptacle connector, where the plug module stop may include a cage latch formed integral with the cage, the cage latch configured to engage a housing of the plug connector to limit the reverse translation of the pluggable transceiver module when a force is imposed by the pluggable transceiver by the at least one biasing member.

The receptacle connector may further include a projecting element that is substantially rigid, the projecting element extending from a forward face of the pluggable transceiver module, the projecting element configured to contact an opposing portion of a housing of the connector. The projecting element may have a stepped body comprising a first surface and a second surface on differing vertical planes, the first surface and the second surface being separated by a sloped extending portion, where the first surface and the second surface are generally flat with respect to and parallel with a top surface of a substrate on which the receptacle connector is disposed, and the projecting element is integral with the housing of the pluggable transceiver module.

The receptacle connector may further include a first sidewall projection positioned on a first interior wall of the cage and a second sidewall projection positioned on a second interior wall of the cage opposite that of the first interior wall, the first sidewall projection and the second sidewall projection configured to contact a portion of the pluggable transceiver module to limit further translation of the pluggable transceiver module in the port. The first sidewall projection and the second sidewall projection may be semi-circular punchouts formed on the first and second interior walls of the cage.

In a third aspect, a connector assembly is described that includes a receptacle connector configured to mount to a substrate and form an electrical connection therewith, the receptacle connector comprising a cage that defines a port, the port comprising a first biasing member and a second biasing member positioned therein, and a connector comprising at least one terminal with a contact portion, and a plug connector comprising a pluggable transceiver module configured to be inserted into the port, the pluggable transceiver module comprising circuitry with at least one contact pad configured to engage with the contact portion of the at least one terminal, where the first biasing member and the second biasing member are configured to urge the pluggable transceiver module to a predetermined position such that a stub length of the at least one contact pad has a predetermined length.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION OF THE PREFERRED EMBODIMENTS

Figure 1:
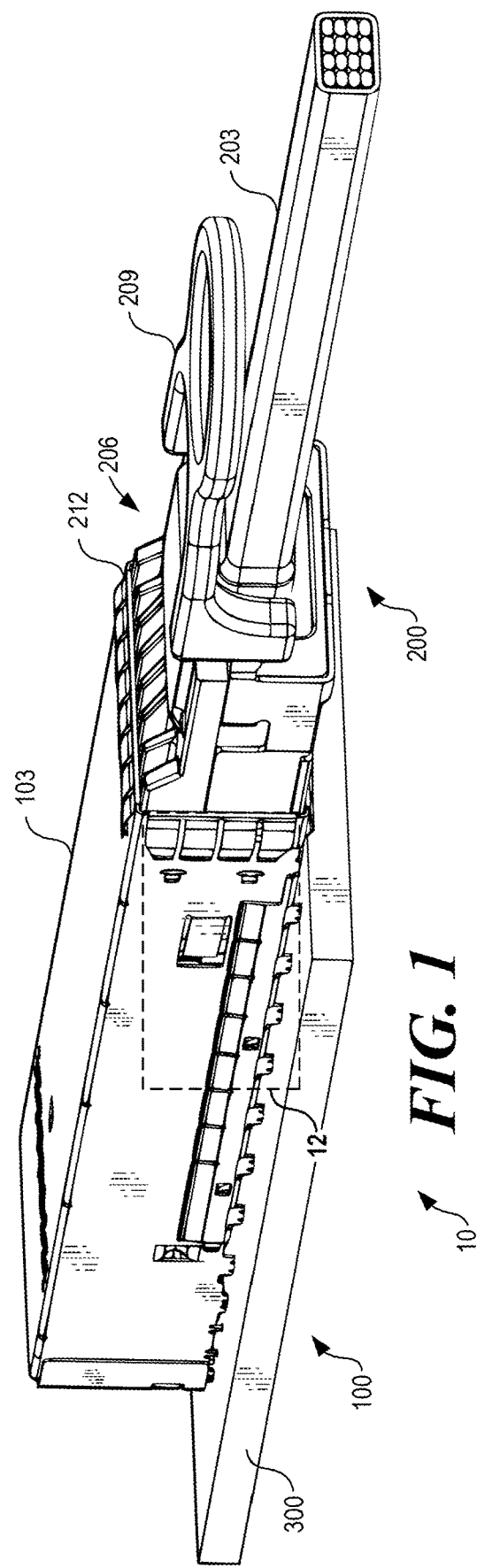
FIG. 1 is a rear perspective view of a biased connector system in accordance with various embodiments of the present disclosure.

Various embodiments are described for a biased connector system, as well as associated methods, apparatuses, and the like. The amount of data processed by computers, computing systems, and computing environments continues to increase. For example, data centers can include hundreds of computing and networking systems interconnected using optical cables, copper cables, and various connectors, cable assemblies, and terminations between them. The data throughput of these interconnects is high and increasing. As examples, many data centers incorporate a combination of 10 Gigabit Ethernet (10 GbE), 25 GbE, 50 GbE, and 100 GbE network interfaces and interconnects. 200 GbE, 400 GbE, and 800 GbE interconnection technology is also being developed and deployed. Other interconnection solutions rely upon 56 Gigabit per second (Gb/s) and 112 Gb/s network interfaces and interconnects, and 224 Gb/s interconnection technology is being developed. A range of cable assemblies are available for data interconnects. A variety of designs exist for each cable assembly, depending on the requirements of the data communications environment in which the connectors are used.

For example, conventional plug module arrangements are designed to include a certain tolerance in a latching system that ensures full engagement between a plug module and a receptacle while guaranteeing sufficient wipe to reliably obtain a proper connection between terminals and a contact pad. This tolerance requires that there be a range of positions that the plug module can be positioned and still have pads on a paddle card suitably engage terminals of the receptacle for data communication. As a result of this tolerance stack up, contact pads of the paddle card are generally made longer so that electrical contact with the contact portions of the terminals is assured.

A range of SFP pluggable transceiver modules are currently available, including small form-factor pluggable double density (SFP-DD), compact small form-factor pluggable (cSFP), SFP+, quad small form-factor pluggable (QSFP), quad small form-factor pluggable double density (QSFP-DD), and others. SFP pluggable transceiver modules often include one or more packaged semiconductor circuit devices or chips. An active electrical cable (AEC) assembly with SFP pluggable transceiver modules, for example, can include a packaged semiconductor chip for signal re-timing. AEC assembly semiconductor chips can reset loss and timing planes for data signals, remove noise, and improve signal integrity, among other functions. An active optical cable (AOC) assembly with SFP pluggable transceiver modules, for example, can include a packaged semiconductor chip for converting optical signals to electrical signals. Semiconductor chips in AOCs can include receiver optical subassemblies (ROSAs) configured to receive optical signals transmitted by transmitter optical subassemblies (TOSAs). The ROSAs are configured to convert the optical signals back to electrical signals.

The additional length of electrical contacts on a paddle card, however, creates a "stub" or a short length of conductive material electrically isolated on one end. The stub causes signals to propagate thereon where the signals are then reflected back into an actual transmission channel. The stub causes additional noise during data communication. At lower data rates, the required size of the stub is not overly problematic as the signaling frequency is low enough such that the stub can be ignored. At high data rates (e.g., 112 Gbps, 224 Gbps, and so forth), however, the signaling frequency becomes so high that the stub length materially impacts signal integrity. It turns out, however, that it is impractical to improve the tolerance of the latching system due to the stack up of the various elements that must be managed and thus it is difficult to reduce the stub length.

Accordingly, various embodiments are described herein for biasing a position of a plug module relative to a receptacle such that contact portions of terminals that engage contact pads on a paddle card are biased toward an edge of the contact pad and biased toward one edge of the tolerance range permitted by the latching system. This allows a resultant length of the stub to be shortened such that it no longer has a material impact on signal integrity.

In the context outlined above, various embodiments for a connector assembly are described for ensuring that a stub length is a predetermined length or is within a predetermined range tolerable for data communication (and without substantial signal interference). In various embodiments, the connector assembly include a receptacle connector configured to mount to a substrate and form an electrical connection therewith. The receptacle connector includes a cage that defines a port having a connector positioned therein. The connector includes a card slot that is aligned with the port. Further, the port includes at least one biasing member positioned therein. The connector may include, for example, at least one terminal with a contact portion positioned in the card slot.

The connector assembly further includes a plug connector having a pluggable transceiver module. The connector assembly, thus, is configured to be inserted into the port. In various embodiments, the pluggable transceiver module includes a paddle card with at least one contact pad configured to engage with the contact portion of the at least one terminal. The at least one biasing member may bias or urge the pluggable transceiver module away from the connector so that a stub length of the contact pad is a predetermined length or is within a predetermined range deemed to be tolerable for data communication as various speeds, such as 224 Gb/s, among others.

Figure 2:
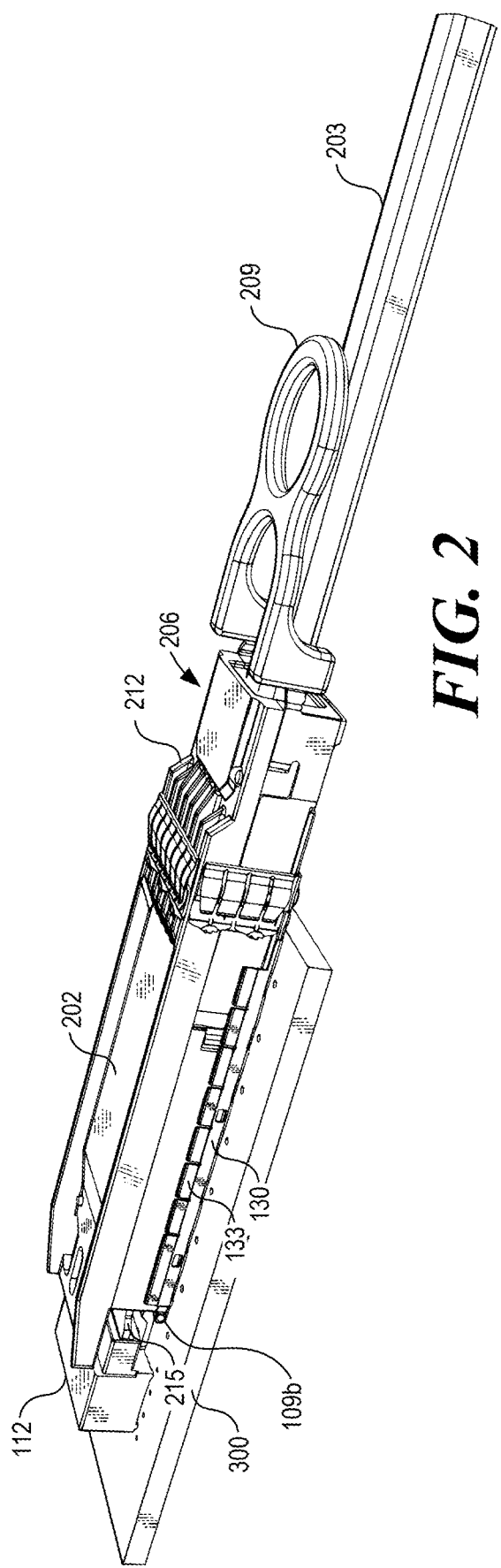
FIG. 2 is a side perspective view of a biased connector system in accordance with various embodiments of the present disclosure.
Figure 3:
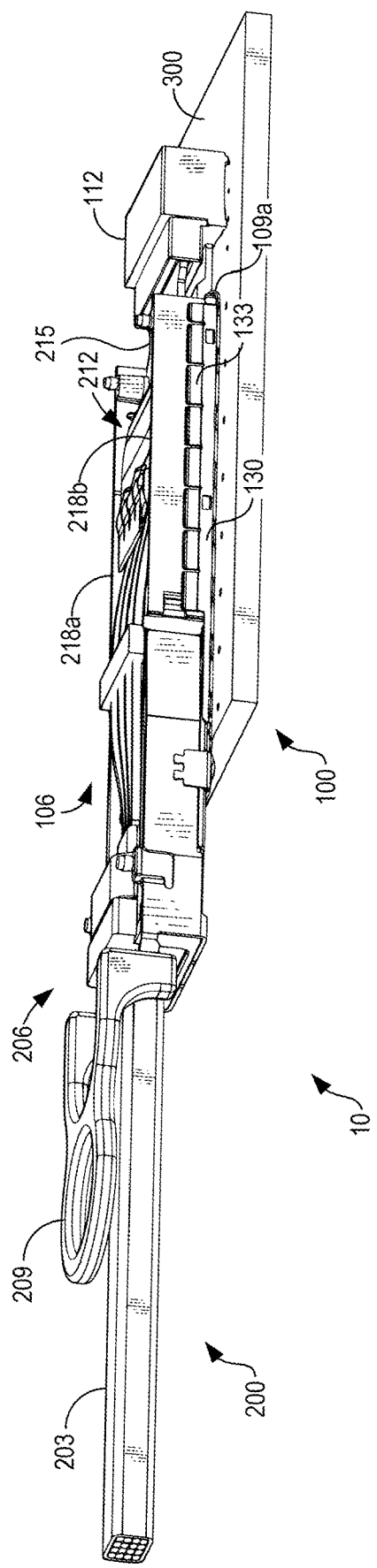
FIG. 3 is a side perspective view of a biased connector system in accordance with various embodiments of the present disclosure.
Figure 4:
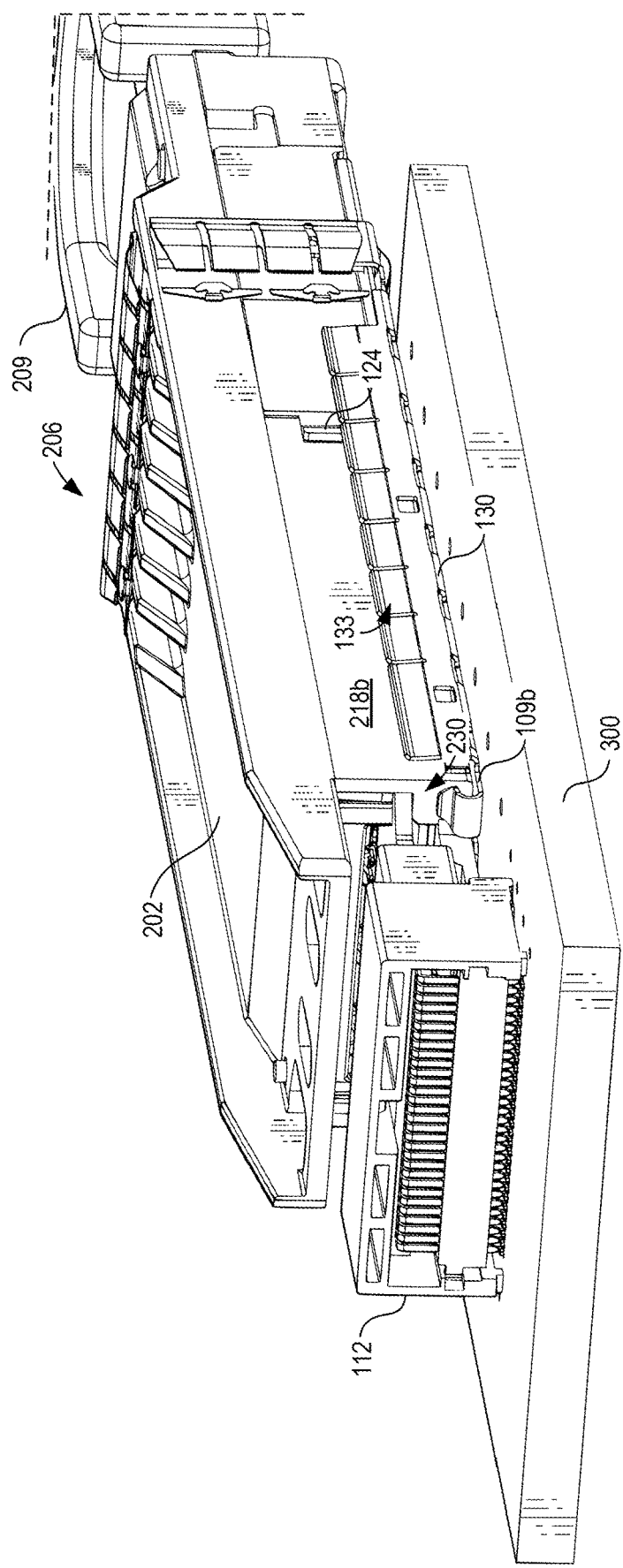
FIG. 4 is a front perspective view of a biased connector system in accordance with various embodiments of the present disclosure.
Figure 12:
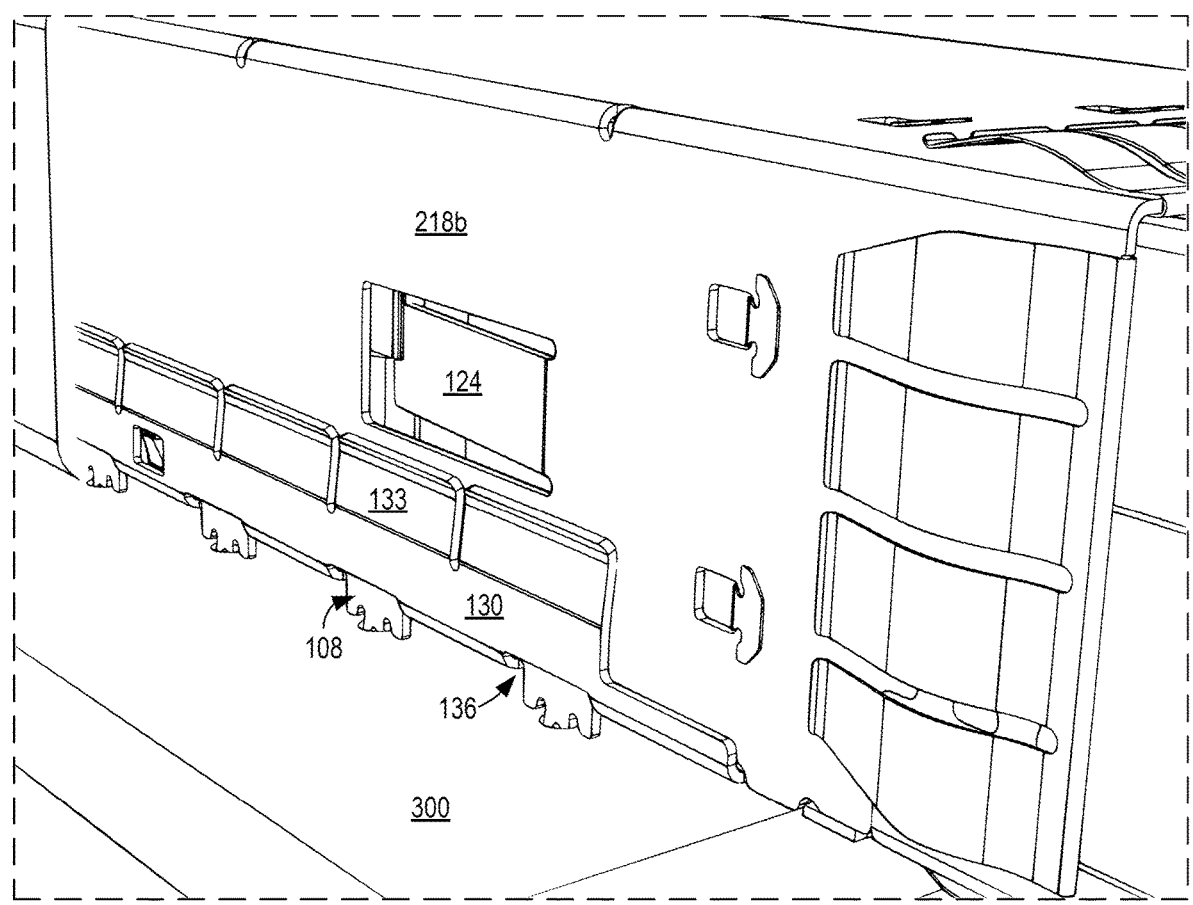
FIG. 12 is an enlarged side perspective view of a biased connector system in accordance with various embodiments of the present disclosure.
Figure 13:
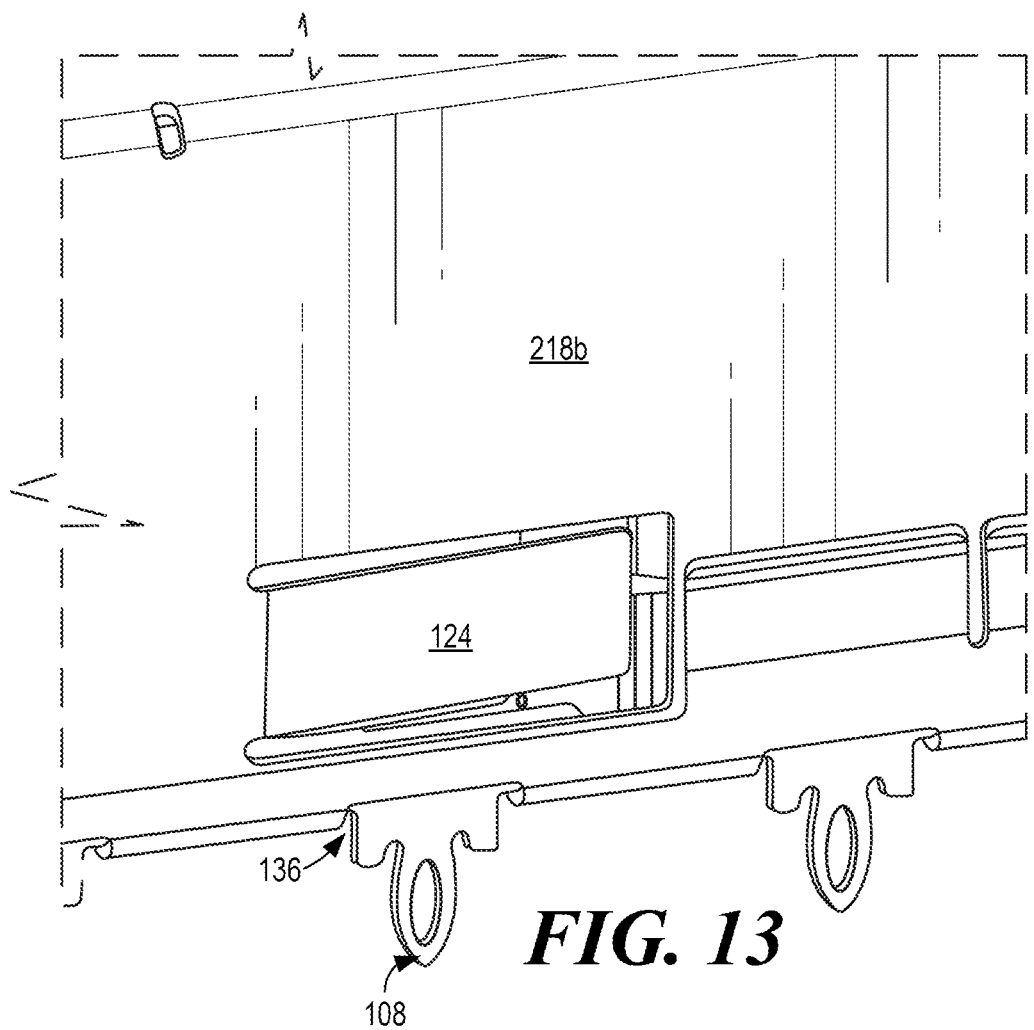
FIG. 13 is an enlarged side perspective view of a biased connector system in accordance with various embodiments of the present disclosure.
Figure 14:
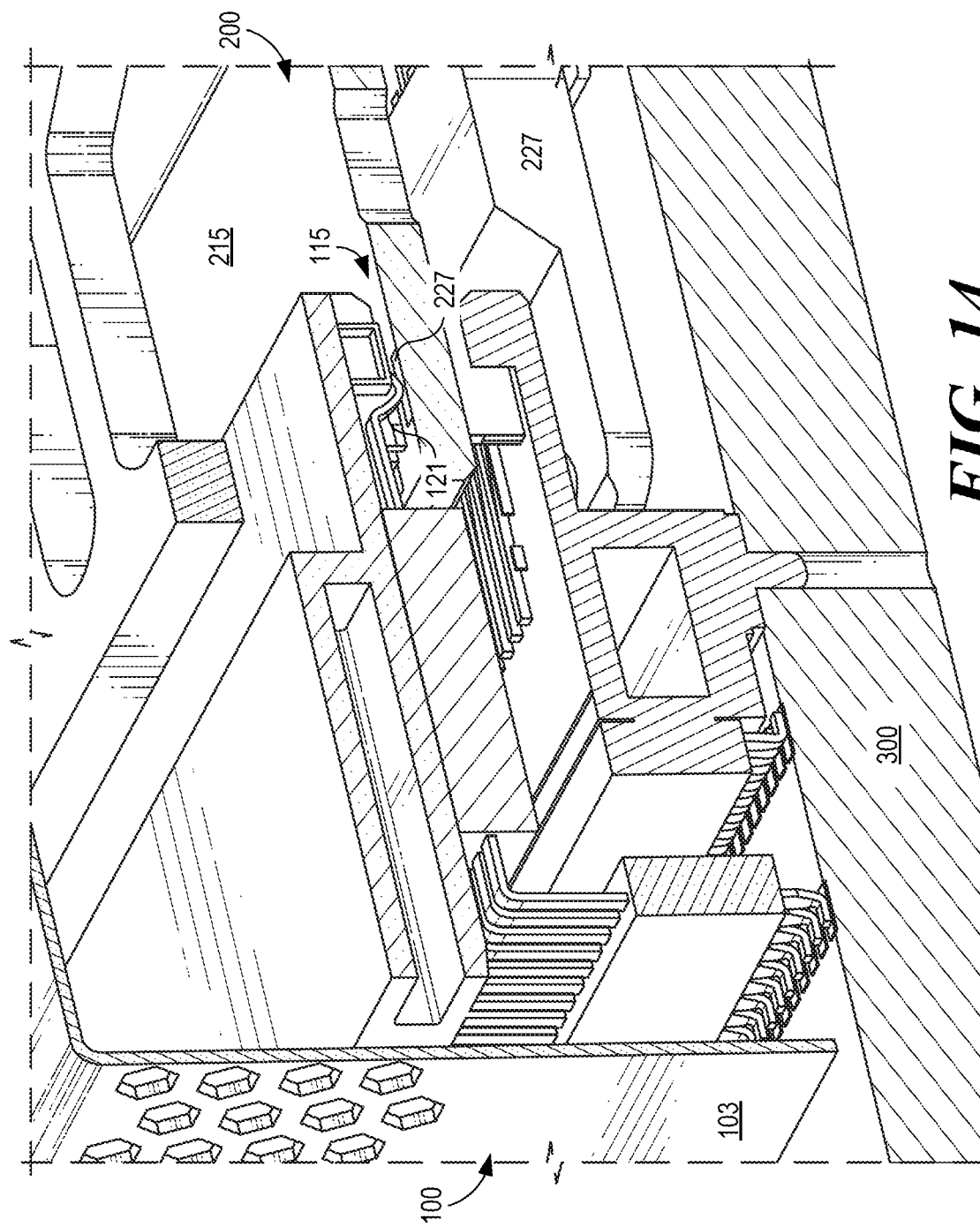
FIG. 14 is a cross-section of a perspective view of a biased connector system in accordance with various embodiments of the present disclosure.
Figure 15:
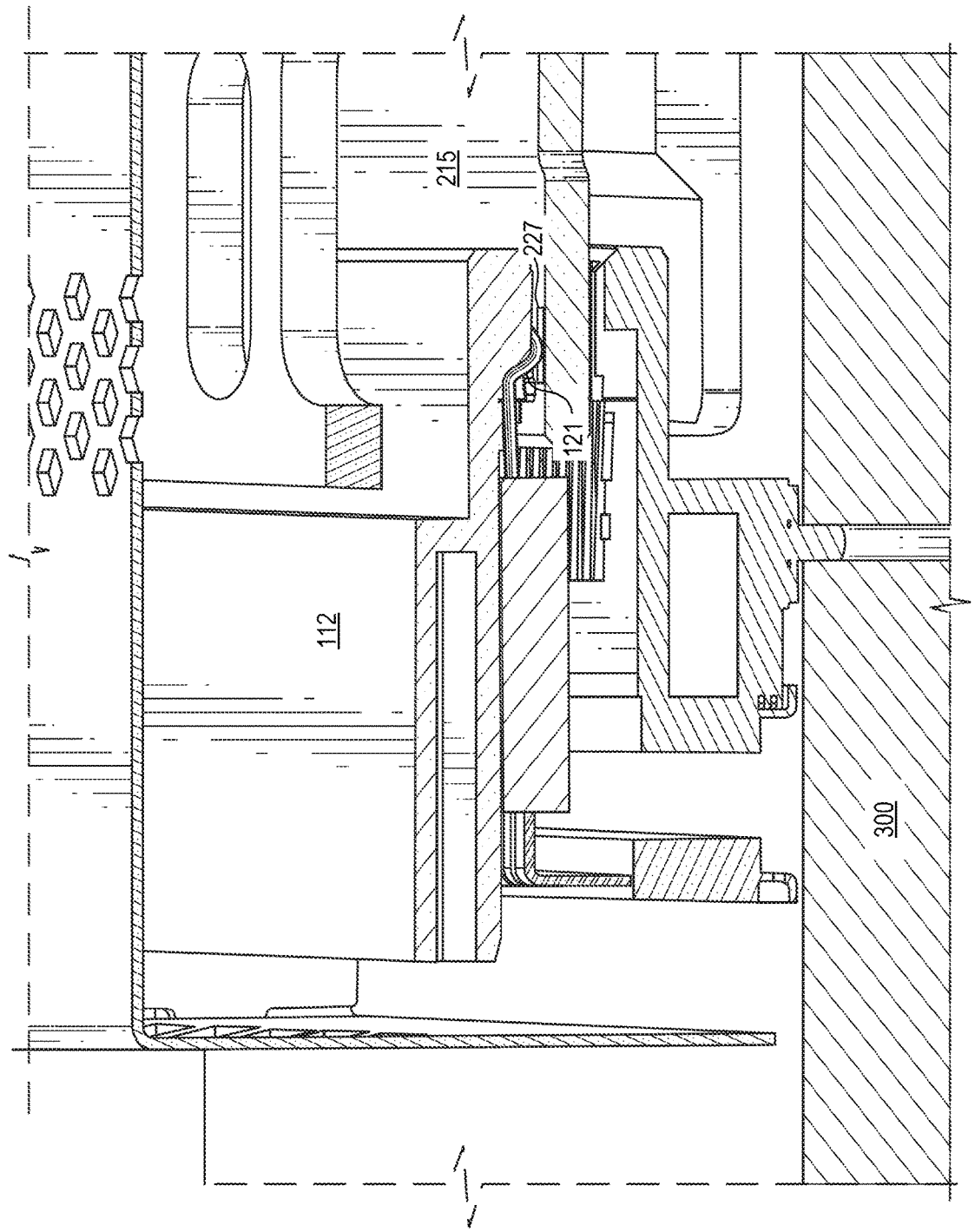
FIG. 15 is a cross-section of a perspective view of a biased connector system in accordance with various embodiments of the present disclosure.

Turning now to the drawings, FIG. 1-9 are various perspective views of a connector assembly 10 that includes a receptacle connector 100 (or "receptacle 100"), a plug connector 200, and a circuit board 300. Specifically, with respect to FIG. 1, FIG. 1 is a rear perspective view illustrating a connector assembly 10 according to various embodiments. FIG. 1 includes a callout region 12 that is shown enlarged in FIG. 12. FIG. 2, similarly, is a rear perspective view from a side where a cage and an insulator of the receptacle 100 are not shown for explanatory purposes. FIG. 3 is a side perspective view of the connector assembly 10 from a side opposite that of FIGS. 1 and 2, where a top and sides of the cage 103, and a top portion of the plug connector 200, are not shown for explanatory purposes. FIG. 4 is a front perspective view of the connector assembly 10, where a top and sides of the cage 103 are not shown for explanatory purposes.

Generally, with reference to FIGS. 1-4, the connector assembly 10 includes the receptacle 100 and the plug connector 200. The receptacle 100 may be configured to mount to the circuit board 300 or other substrate to enable communication between the plug connector 200 and the circuit board 300 as well as other upstream or downstream electronics.

Among other components, the receptacle 100 includes a cage 103 defining a port 106 (see FIG. 3) that is configured to receive the plug connector 200. A portion of the cage 103 of the receptacle 100 is shown in FIG. 1, but the cage 103 is omitted in FIGS. 2, 3, 4, 6, 7, and 9 for explanatory purposes. The cage 103 may be formed of a metallic and conductive material in some embodiments and, as such, the cage 103 may be formed from a metal or metal alloy. An insulator shield or dust shield (not shown) may be positioned, at least partially, around a portion of the cage 103. In some implementations, the cage 103 may include a multitude of prongs 108, shown in the enlarged view of FIG. 10, that extend downward for mechanical, electrical, or mechanical and electrical coupling (including grounding) with the circuit board 300. For instance, in some embodiments, the prongs 108 are conductive for grounding the cage 103 to the circuit board 300 or grounding traces thereof. FIG. 3 shows the receptacle 100 without its top cover 202 for explanatory purposes.

Figure 5:
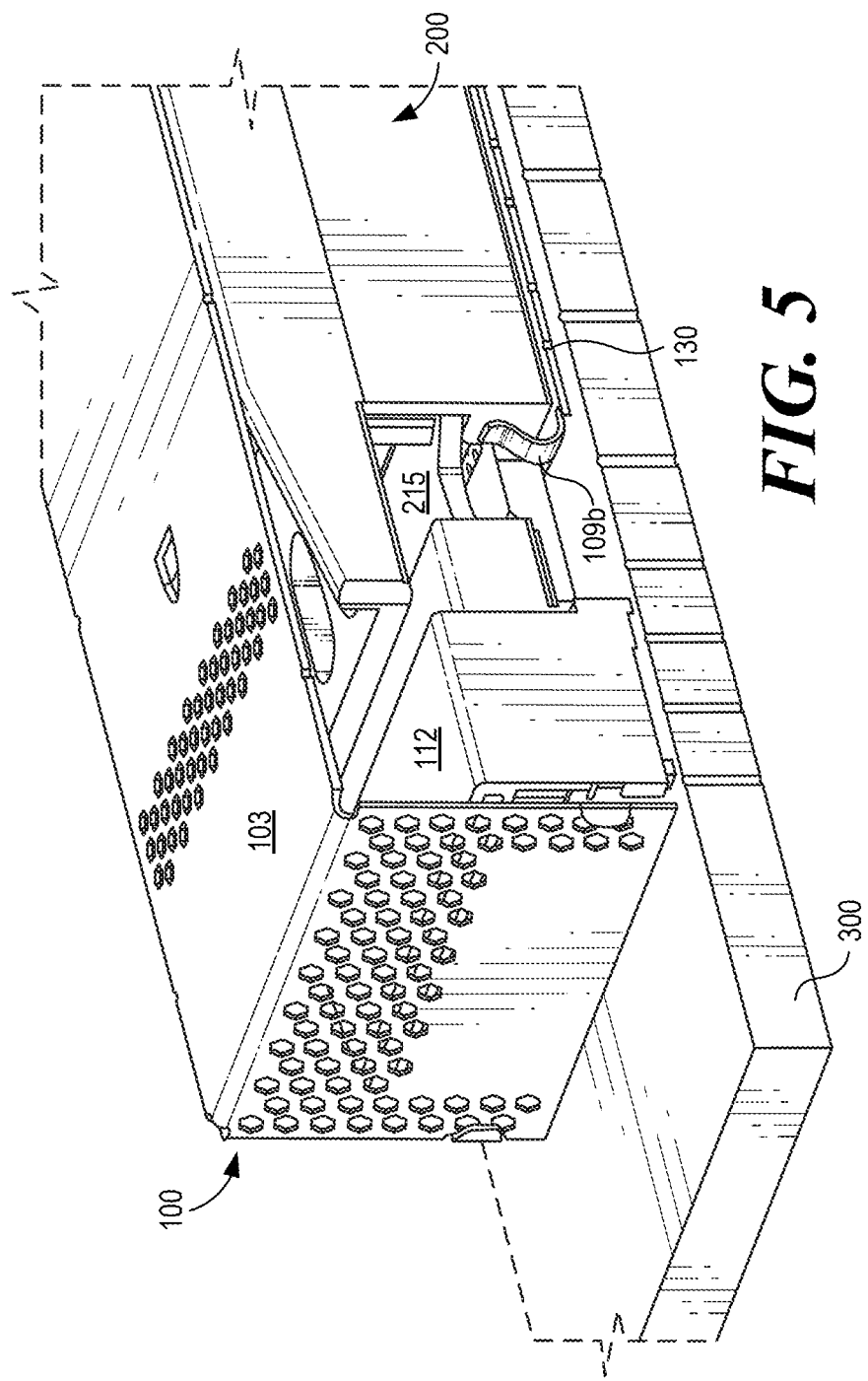
FIG. 5 is a partial side perspective view of a biased connector system in accordance with various embodiments of the present disclosure.

FIG. 5 is an enlarged partial cross-section view of a front portion of the connector assembly 10, whereas FIGS. 6, 7, 8, and 9 are various side views of the front portion of the connector assembly 10. Referring to FIGS. 1-9 collectively, the plug connector 200 may include a cable 203 attached to a pluggable transceiver module 206 (also "plug module 206") which may be positioned at a distal end of a cable 203. The plug module 206, or at least a portion thereof, can be inserted into the port 106 of the receptacle 100, as may be appreciated. The plug module 206 can be inserted into and nest within the port 106 to make electrical connections with a connector positioned within the receptacle 100, as will be described. Further, the plug module 206 includes a latch handle 209 that is configured to allow a latch system of the plug connector 200 to engage or release from the receptacle 100. Alternative embodiments of the plug connector 200, however, may include a cable body that does not have a latch handle 209 or latch system attached thereto.

The plug module 206 has a housing 212 that protects, and has therein, circuitry such as a paddle card 215. For instance, the housing 212 may include a first sidewall 218a and a second sidewall 218b that shield sides of the paddle card 215. The paddle card 215 may include contact pads 221 for forming an electrical connection with the connector 112 within the receptacle 100 and respective components, such as the circuit board 300. The circuit board 300 may include, for example, a printed circuit board (PCB) of a computing, networking, or related system, on which the receptacle 100 is mounted. As such, the paddle card 215 may be part of an interface between the plug connector 200 and the receptacle 100.

The cable 203 of the plug connector 200 is not intended to be limited to any particular type of cable or cable assembly, and the cable 203 may be embodied as a fiber optic, copper, or other type of cable. Thus, the cable 203 is an example of an AEC, and AOC, or related type of cable. The plug module 206 is also representative and the concepts described herein can be applied to a range of pluggable modules, including SFP, SFP-DD, cSFP, SFP+, QSFP, QSFP-DD, and related types of pluggable modules.

Next, with reference to the receptacle 100, the receptacle 100 may include a connector 112 having a card slot 115 that is aligned with the port 106. The port 106 may further include one or more biasing members 109a, 109b (collectively "biasing members 109"). The connector 112 may include a multitude of terminals 121 with a contact portion positioned, at least partially, in the card slot 115. The terminals 121 of the connector 112 may engage conductive contact pads 227 of the paddle card 215, as will be described.

In order to position the plug module 206 appropriately, the one or more biasing members 109a, 109b (collectively "biasing members 109") may be located in the cage 103. For instance, the biasing members 109 are positioned in or within the port 106 in order to contact a portion of the housing 212 of the plug module 206. In accordance with various embodiments, the biasing member 109 may be formed in a bottom wall of the cage 103 that defines the port 106. As such, the biasing member 109 may be integral with a bottom or side surface of the cage 103 in some embodiments. For instance, in embodiments in which the cage 103 is formed of a single metallic or conductive material, a single piece of sheet metal may be stamped to form the biasing members 109.

When the plug module 206 is fully inserted into the cage 103, the biasing member 109 may engage or otherwise contact the housing 212 of the plug module 206. The biasing member 109 will bias (e.g., push, apply pressure or force to, etc.) the plug module 206 in the direction Di shown in FIG. 7. As depicted, the plug module 206 may be biased in a direction opposite of the insertion direction or, in other words, away from the connector 112 to which the plug module 206 (and, more specifically, the paddle card 215 thereof) is mated. In other words, the one or more biasing members 109 may apply a force against the plug module 206 in a direction opposite of the insertion direction and/or away from the connector 112 to which the plug module 206 is mated. It normally would be undesirable to have a biasing member 109 act to inhibit insertion of the plug module 206 into the receptacle 100 as such activity would have a tendency to increase insertion force, which may cause damage to the plug module 206 or the receptacle 100 due to an overexertion of force. However, it has been determined that by placing the biasing member 109 near an end of an expected plug module travel range, the impact on an insertion force is substantially mitigated.

Figure 10:
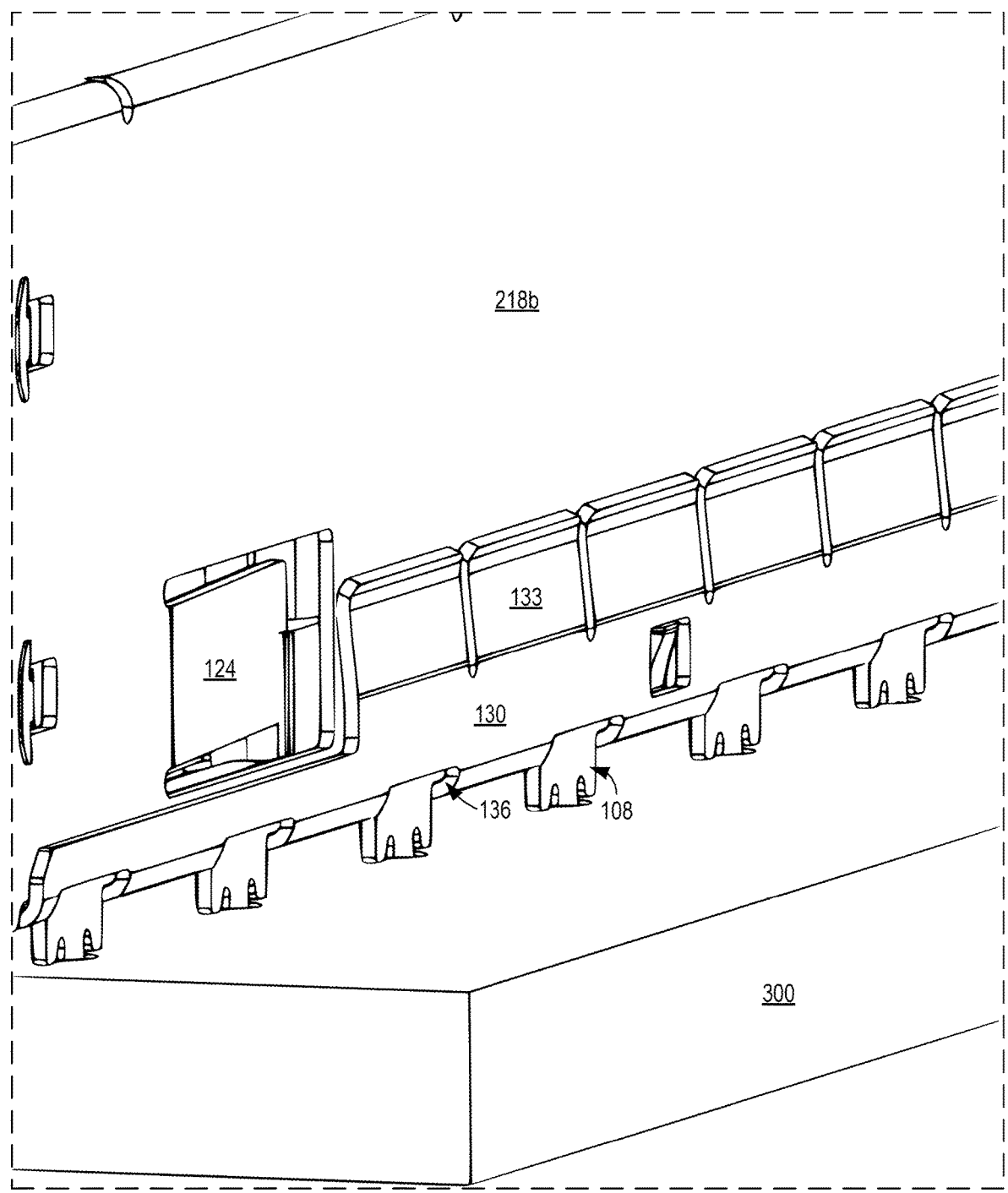
FIG. 10 is an enlarged side perspective view of a biased connector system in accordance with various embodiments of the present disclosure.
Figure 11:
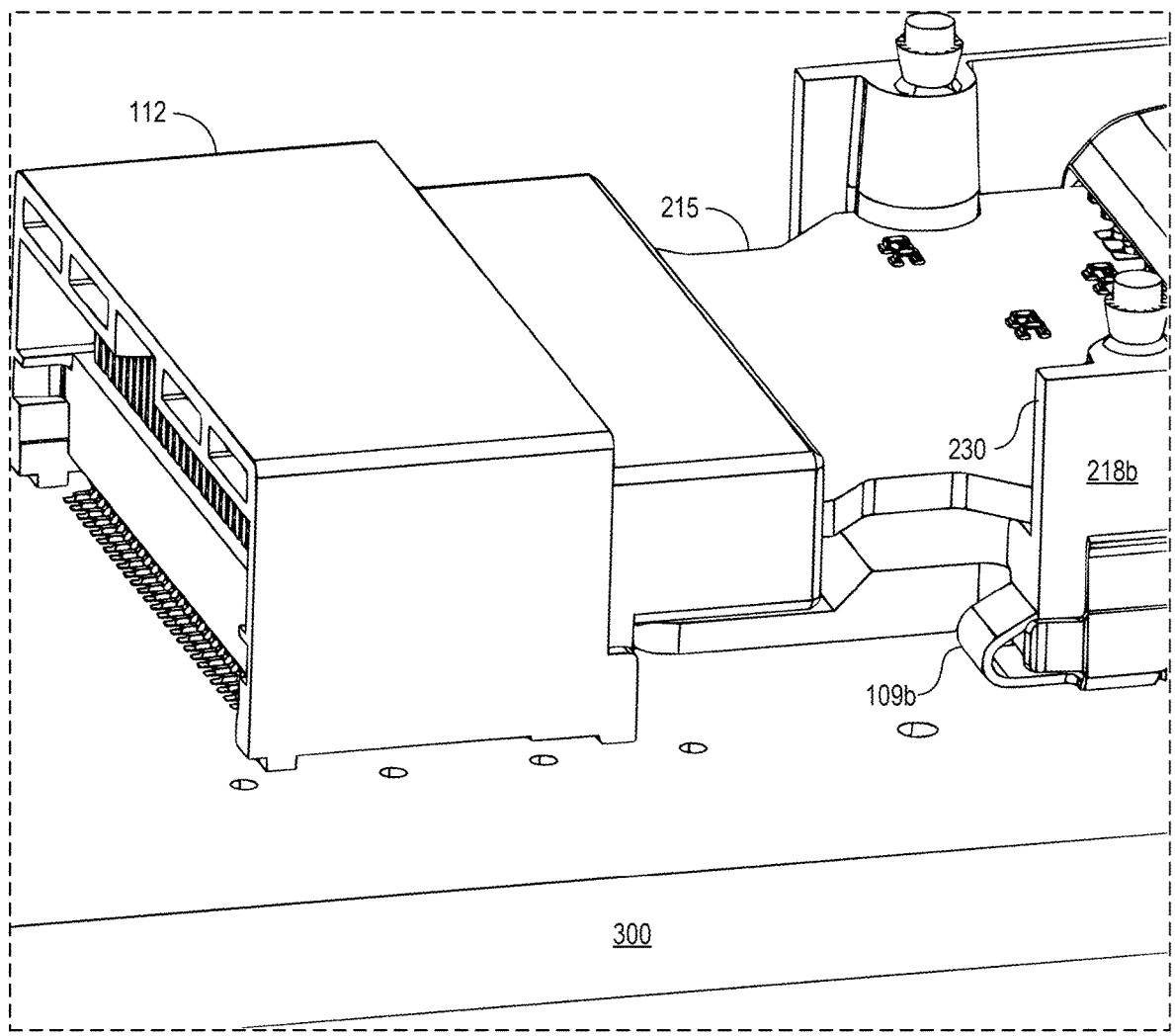
FIG. 11 is an enlarged side perspective view of a biased connector system in accordance with various embodiments of the present disclosure.

To prevents the plug module 206 from being accidently pulled back out of the port 106 of the cage 103, particularly now that the biasing members 109 are applied a force on a front portion of the plug module 206, reverse translation caused by the biasing member 109 may be limited by a plug module stop in some embodiments, which can be a cage latch 124 such as is shown in FIG. 10, that engages the housing 212 of the plug module 206 and thus limits rearward travel of the plug module 206. For instance, the housing 212 of the plug module 206 may include a projection, hook, or other device that catches or otherwise engages with the cage latch 124.

Figure 7:
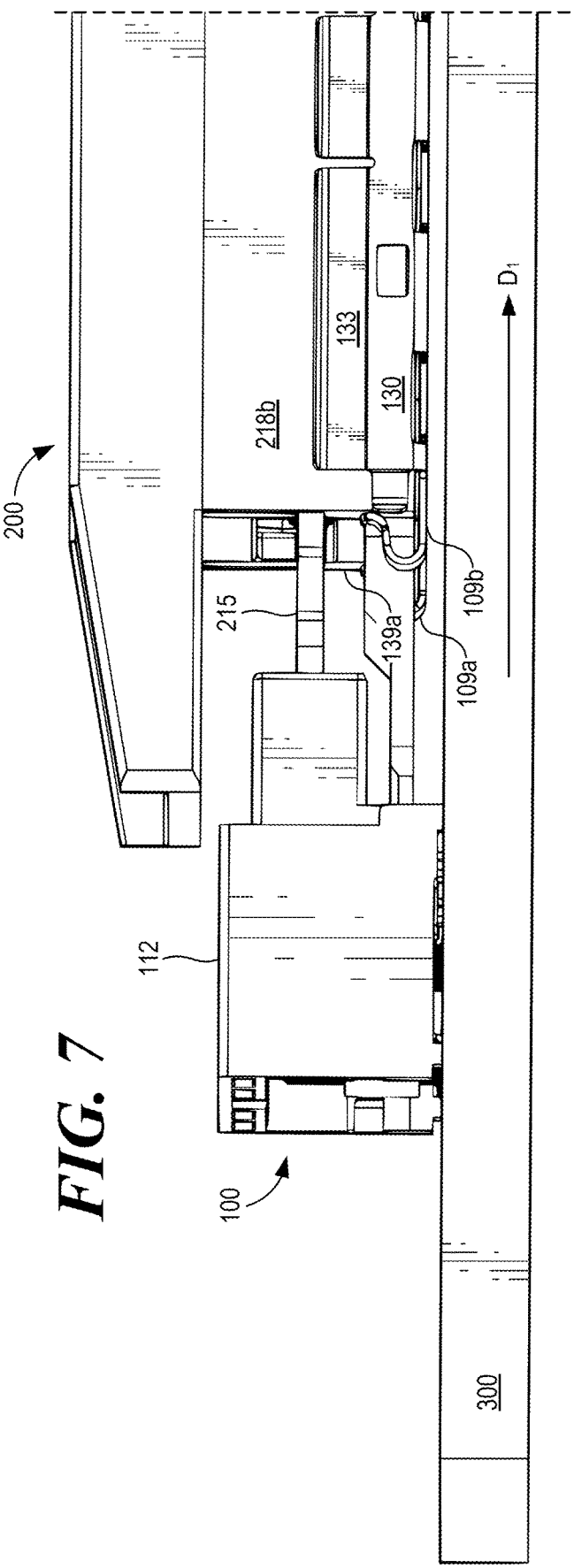
FIG. 7 is a side perspective view of a biased connector system in accordance with various embodiments of the present disclosure.
Figure 8:
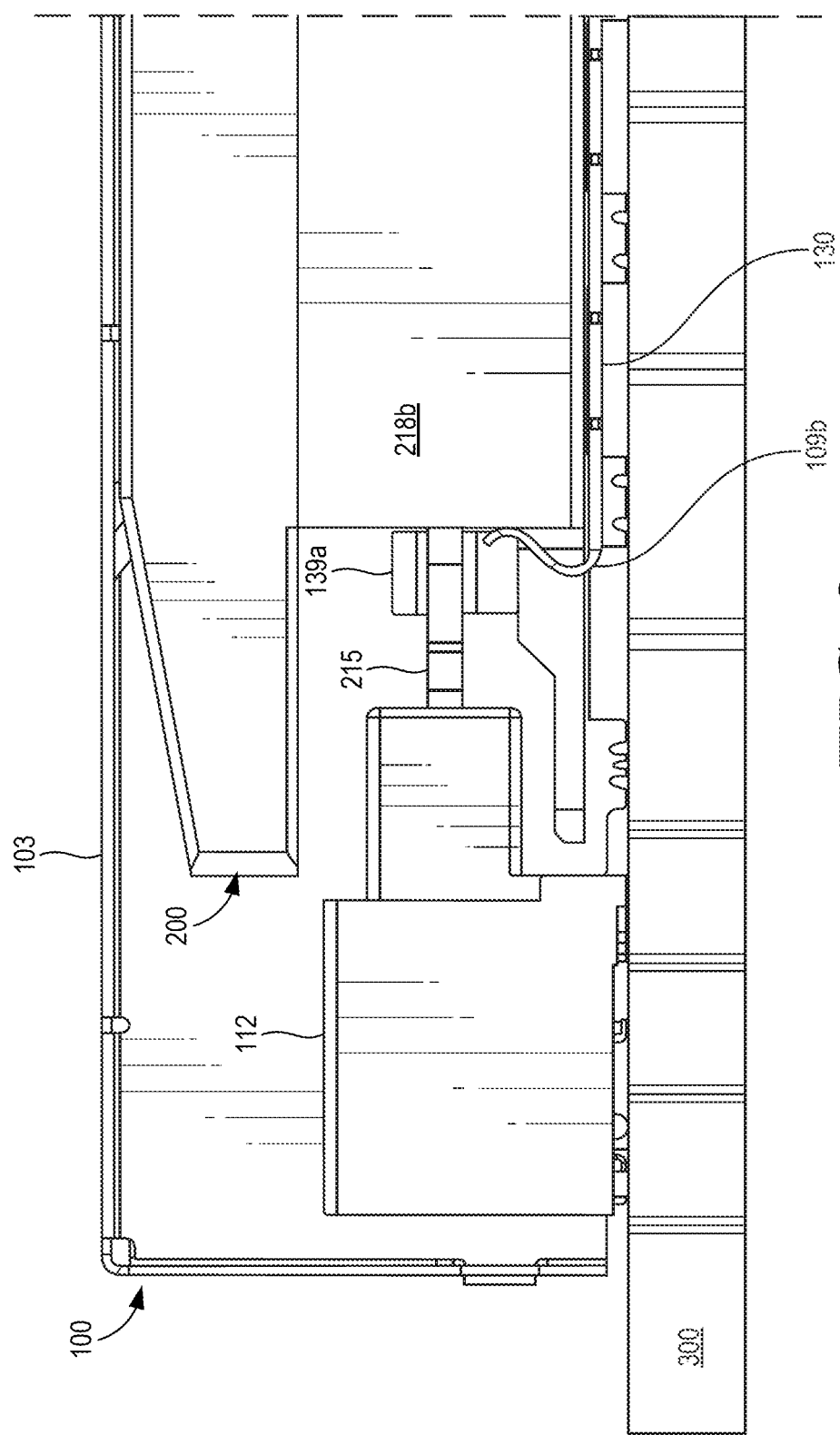
FIG. 8 is a side view of a biased connector system in accordance with various embodiments of the present disclosure.
Figure 9:
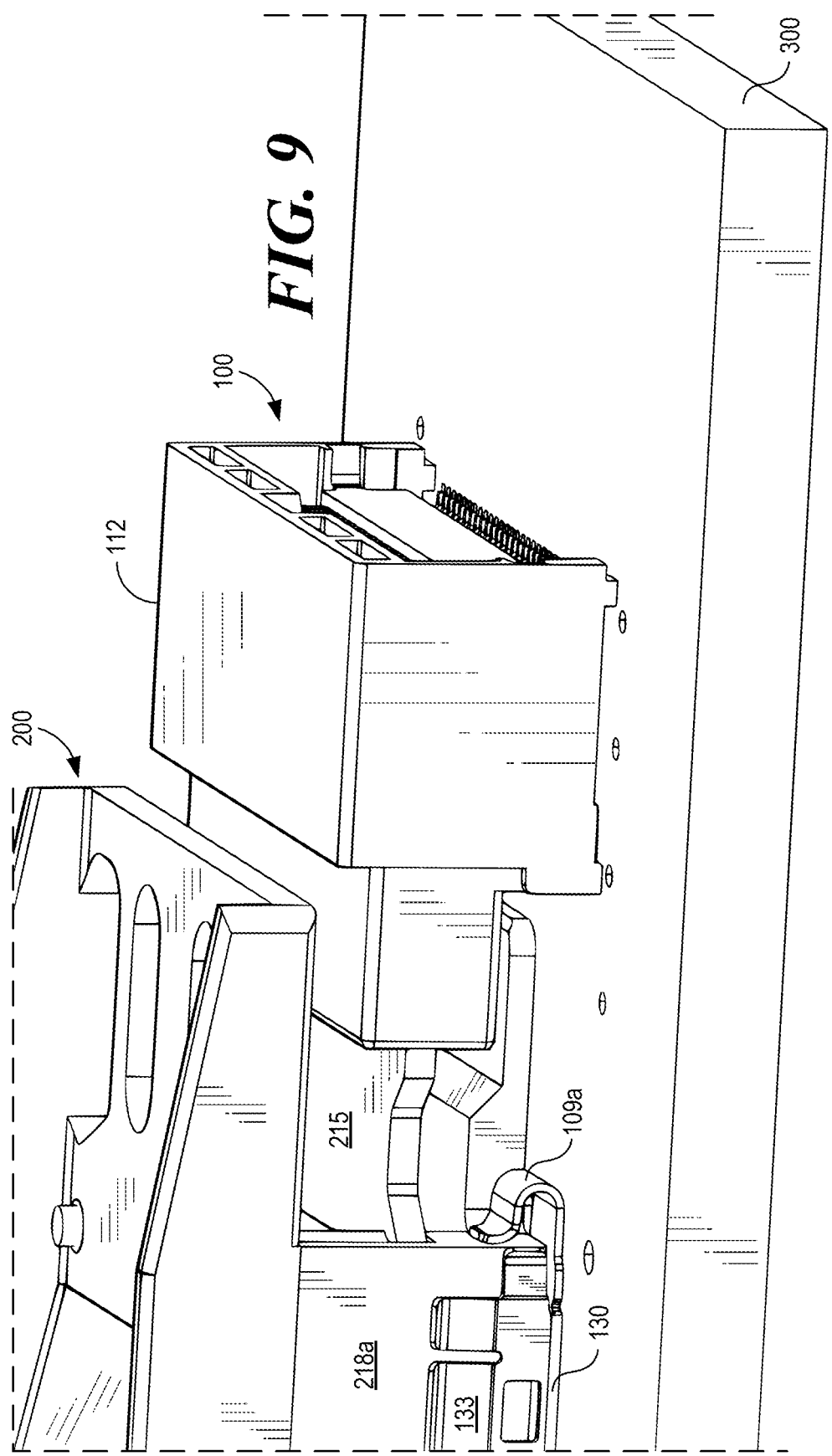
FIG. 9 is a front perspective view of a biased connector system in accordance with various embodiments of the present disclosure.
Figure 18:
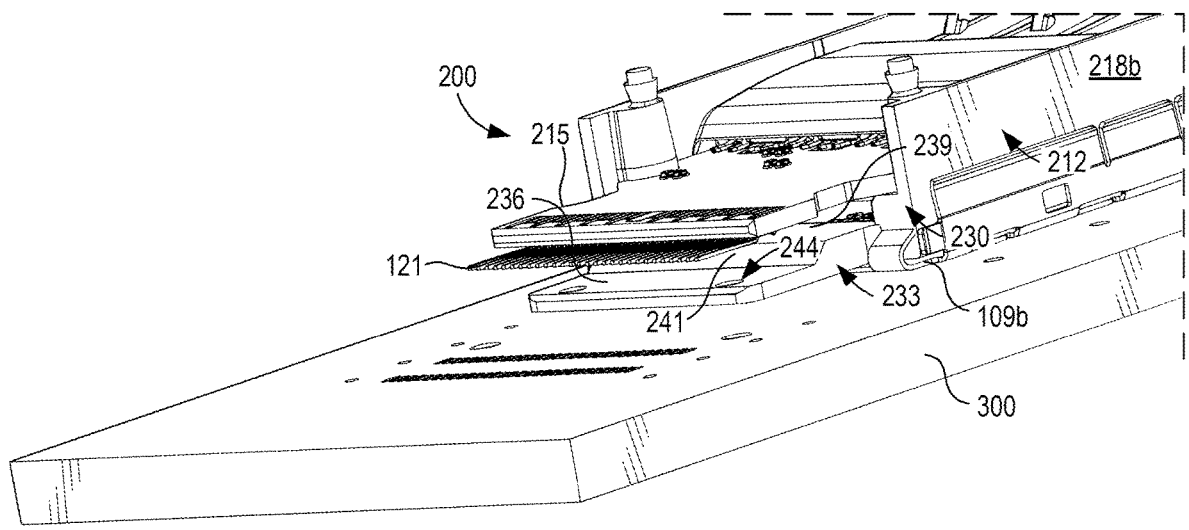
FIG. 18 is an enlarged perspective view of a biased connector system with a receptacle connector not shown in accordance with various embodiments of the present disclosure.

To ensure the plug module 206 is not translated too far, the translation caused by the biasing member 109 may be limited by a projecting element 233 in some embodiments, as shown in FIGS. 7, 8, and 18. The projecting element 233 may contact an opposing portion of a housing of the connector 112, which is not shown in FIG. 18 for explanatory purposes, to limit the travel of the plug module 206. FIG. 18 also shows the plug connector 200 without its top cover 202 for explanatory purposes. The projecting element 233 may include a substantially rigid device that projects from a forward face 230 of the housing 212 that ensures that a force greater than being handled by the biasing members 109 is not imposed on the one or more biasing members 109. In addition to or alternatively, the travel of the plug module 206 caused by the biasing member 109 can be limited by the latching system.

In some embodiments, the projecting element 233 includes a stepped body having, for example, a first surface 236 and a second surface 239 on differing vertical planes or heights relative to the circuit board 300. The first surface 236 and the second surface 239 may be separated by a vertical or sloped extending portion 241 such that the second surface 239 may be positioned below the connector 112 and the paddle card 215 when coupled. While the first surface 236 and the second surface 239 are generally flat with respect to (and parallel with) a top surface of the circuit board 300, the sloped extending portion 241 may be angled downwards, for example. This sizing and positioning may enable the paddle card 215 and the terminals 121 of the connector 112 to have sufficient room to couple and form an electrical connection. The projecting element 233 may include apertures 244 which may align with projections of the top cover 202 or other appropriate component. Further, in some embodiments, the projecting element 233 is integral with the housing 212 of the plug module 206.

Figure 19:
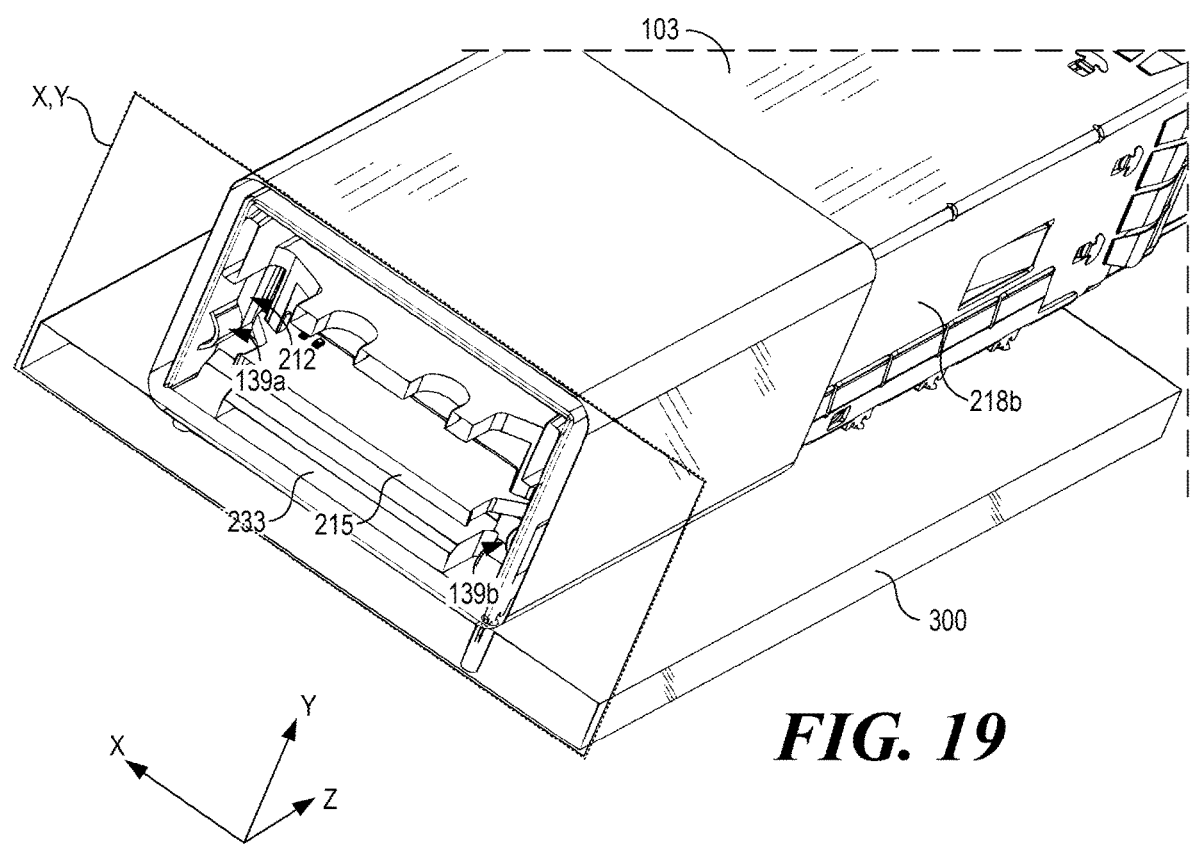
FIG. 19 is a cross-section perspective view of a biased connector system with a connector of a receptacle not shown in accordance with various embodiments of the present disclosure.

Further, in addition to or alternatively with respect to the cage latch 124 and the projecting element 233, to ensure the plug module 206 is not translated too far, the translation caused by the biasing member 109 may be limited by sidewall projections 139a, 139b (collectively "sidewall projections 139"), as shown in FIG. 19. FIG. 19 shows a cross-section along the X-Y axis of a front portion of the connector assembly 10. The sidewall projections 139 may be positioned on interior walls of the cage 103, for example, and, as such, may be integral with the cage 103 in some implementations. For instance, the sidewall projections 139 may include punchouts formed in a single piece of metal. As shown in FIG. 19, the sidewall projections 139 may be semi-circular, however, in other implementations, other shaped projections may be employed. Generally, the sidewall projections 139 contact a front portion (or other suitable portion) of the housing 212 to ensure the plug module 206 is not translated too far into the port 106. Like the projecting element 233, the sidewall projections 139 may include substantially rigid devices that ensure that a force greater than being handled by the biasing members 109 is not imposed on the one or more biasing members 109.

Accordingly, by more precisely controlling the location of the plug module 206 in the port, the contact portion of the terminal can be biased toward an end of the contact pad while still ensuring a reliable connection and thus the stub length can be reduced. As a result, the signal integrity performance is improved, especially for high data rate applications (e.g., 112 Gbps, 224 Gbps, and so forth).

In various embodiments, the biasing member 109 includes a first biasing member 109a and a second biasing member 109b although embodiments disclosed herein are not limited to only one or two biasing members 109. As such, there may be three biasing members 109, four biasing members 109, and so forth. In embodiments in which there are at least two biasing members 109, the first biasing member 109a may be positioned on a first side of the port 106 and the second biasing member 109b may be positioned on a second, opposing side of the port 106. As shown in the enlarged view of FIG. 7, the first biasing member 109a and the second biasing member 109b may be positioned and configured to contact opposing sides of a distal end of the plug module 206. For instance, the biasing members 109 may contact a forward face 230 of the plug module 206. It is understood, however, that the biasing member 109 may be otherwise positioned in the port 106 and thus may contact other portions of the plug module 206 to bias or urge the plug module 206 in direction Di.

The receptacle 100 may further include a base plate 130 in some embodiments. In some embodiments, the base plate 130 may be separate from or integral with the cage 103. The base plate 130 may contact the circuit board 300 or other substrate and, as such, may include a substantially planar or flat surface in various embodiments. The base plate 130 may include a multitude of fingers 133 that engage, guide, and retain the plug module 206 within the port 106. The fingers 133 may be formed integral with the base plate 130 in some embodiments. As shown in FIG. 10, the fingers 133 may be curved to bias or urge respective sidewalls 218 of the housing 212 of the plug module 206, providing the plug module 206 with a secure and snug fit.

Figure 6:
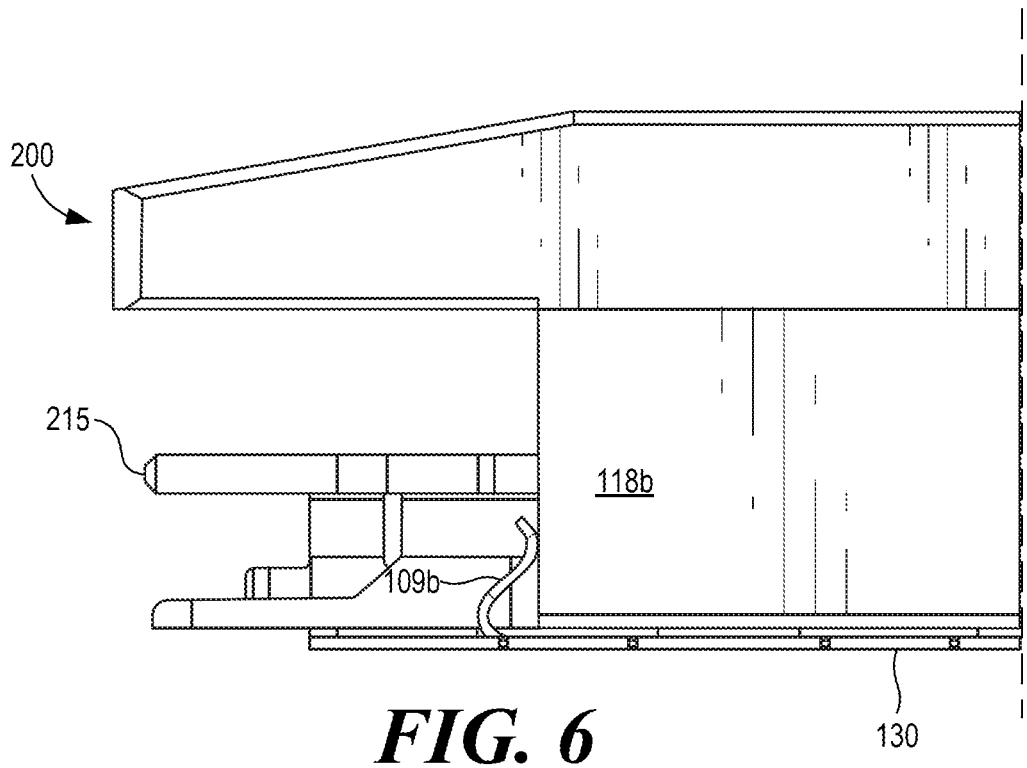
FIG. 6 is a side view of a biased connector system in accordance with various embodiments of the present disclosure.

Also shown in FIG. 10, the base plate 130 may further include a multitude of prong apertures 136. The prongs 108 of the cage 103, for example, may be positioned through the prong apertures 136 such that the prongs 108 mechanically and/or electrically couple to the circuit board 300. Like the fingers 133, the biasing members 109 may be formed integral with the base plate 130 in some embodiments, and may extend vertically with respect to a plane of the base plate 130. As shown in FIG. 6, the biasing members 109 may be curved to bias or urge the housing 212 of the plug module 206 such that a stub length is a predetermined distance or within a predetermined range of distances, as will be discussed. As such, in some embodiments, the biasing member 109 is S-shaped that, when formed of a suitable material, such as stainless steel, biases or urges the plug module 206 without providing an overly rigid contact point.

To this end, in various embodiments, the biasing member 109 may be S-shaped. For instance, the biasing member 109 may include a first C-shaped section extending in an insertion direction as well as a second C-shaped section coupled to and integral with the first C-shaped section extending in a direction opposite that of the insertion direction. It is understood, however, that other suitable shapes of the biasing member 109 may be employed without deviating from various aspects of the present disclosure.

Figure 16:
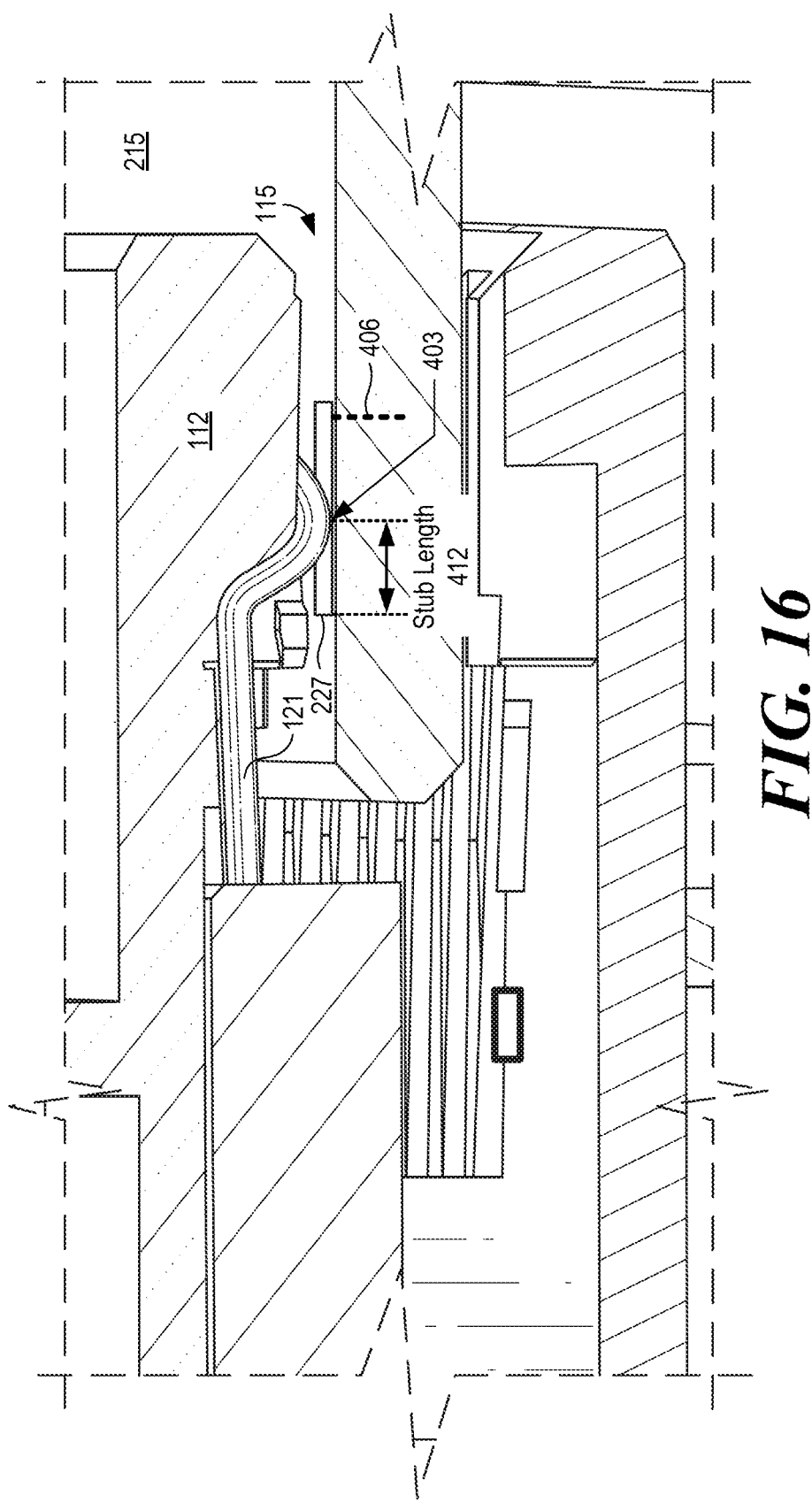
FIG. 16 is a cross-section of a perspective view of a biased connector system in accordance with various embodiments of the present disclosure.
Figure 17:
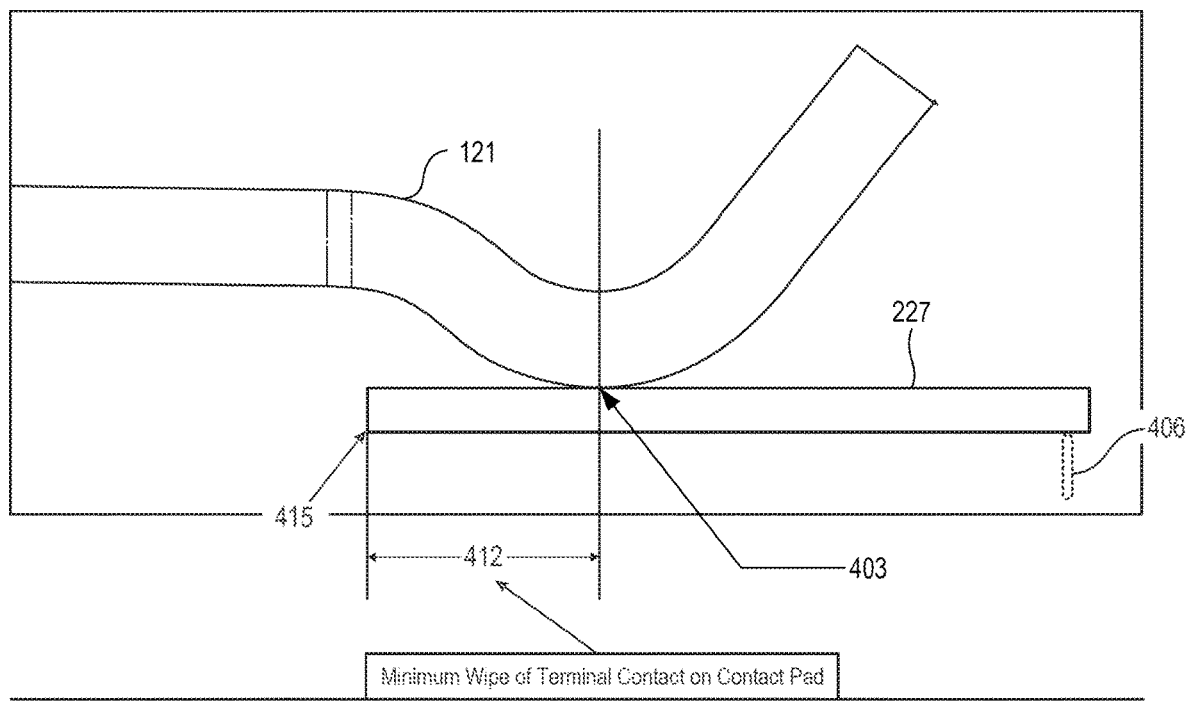
FIG. 17 is a schematic diagram of a biased connector system in accordance with various embodiments of the present disclosure.

Moving along to FIGS. 16 and 17, to improve electrical performance it may be desirable to shift a location of a terminal contact point 403 away from a via 406, which is typically on one end of the contact pad 227 of the paddle card 215. Additionally, a contact pad leading edge 415 is shown for reference. The biasing member 109 (or multitudes thereof) may be configured to urge the terminal contact point 403 toward the stub end 409 or a predetermined distance (or within a range of distances) from the stub end 409. In studies, the variation in the resultant length of the stub, stub length 412, can be reduced by more than 30% and this ability to better predict the amount of stub length allows for improved system performance and less signal interference during data communication. In some embodiments, the stub length 412 is equal to a desired minimum wipe of the terminal 121 on the contact pad 227.

As can be appreciated, while the depicted embodiment illustrates a biasing member 109 that is configured to engage a front face of a plug module housing, such a construction is not required. Alternative constructions include placing a biasing member 109 in a roof of the cage 103, for instance, near the point equal to the maximum depth of where a flange is intended to be inserted. Further, in alternative embodiments a biasing member 109 can be aligned with a slot provided in the plug module housing so that the biasing member 109 is only encountered near the end of travel.

The features, structures, or characteristics described above may be combined in one or more embodiments in any suitable manner, and the features discussed in the various embodiments may be interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims.

The terms "first," "second," etc. are used only as labels, rather than a limitation for a number of the objects. It is understood that if multiple components are shown, the components may be referred to as a "first" component, a "second" component, and so forth, to the extent applicable.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be Therefore, the following is claimed:

1. A connector assembly, comprising:
    a receptacle connector configured to mount to a substrate and form an electrical connection therewith, the receptacle connector comprising a cage that defines a port having a connector positioned therein, the connector comprising a card slot that is aligned with the port, the cage comprising a first biasing member and a second biasing member each at opposing sides of a distal end of the cage and extending from a bottom wall of the cage that is positioned in the port, the connector comprising at least one terminal with a contact portion positioned in the card slot; and
    a plug connector comprising a pluggable transceiver module configured to be inserted into the port, the pluggable transceiver module comprising a paddle card with at least one contact pad configured to engage with the contact portion of the at least one terminal,
    wherein the first biasing member and the second biasing member are configured to contact the pluggable transceiver module and bias the pluggable transceiver module away from the connector so that a stub length of the contact pad is within a predetermined range.

2. The connector assembly according to claim 1, wherein:
    the receptacle connector further comprises a base plate having a plurality of apertures through which prongs of the cage are positioned to form an electrical connection with the substrate;
    the first biasing member and the second biasing member are each formed integral with the base plate; and
    the first biasing member and the second biasing member each extend at least in part vertically from the base plate.

3. The connector assembly according to claim 1, wherein the first biasing member and the second biasing member each comprise a first C-shaped section extending in an insertion direction and a second C-shaped section integral with the first C-shaped section extending in an opposing direction.

4. The connector assembly according to claim 1, wherein the receptacle connector further comprises a plug module stop configured to limit reverse translation of the pluggable transceiver module relative to the receptacle connector.

5. The connector assembly according to claim 4, wherein the plug module stop comprises a cage latch formed integral with the cage, the cage latch configured to engage a housing of the plug connector to limit the reverse translation of the pluggable transceiver module when a force is imposed by the pluggable transceiver by the the first biasing member or the second biasing member.

6. A receptacle connector configured to mount to a substrate and form an electrical connection therewith, comprising:
    a cage that defines a port, the port comprising at least one biasing member positioned therein and at least one terminal with a contact portion,
    wherein the at least one biasing member is S-shaped and comprises a first C-shaped section extending in an insertion direction and a second C-shaped section integral with the first C-shaped section extending in an opposing direction, and
    wherein the at least one biasing member is positioned at an end of an expected plug module travel range, and the at least one biasing member is configured to urge a pluggable transceiver module of a plug connector to a predetermined position such that a stub of a contact pad of the plug connector has a predetermined length when engaged with the at least one terminal.

7. The receptacle connector according to claim 6, wherein:
    the port has a connector positioned therein, the connector comprising a card slot that is aligned with the port; and
    the connector comprises the at least one terminal.

8. The receptacle connector according to claim 7, wherein the at least one biasing member is a first biasing member and a second biasing member.

9. The receptacle connector according to claim 8, wherein:
    the first biasing member is positioned on a first side of a distal end of the port and the second biasing member is positioned on a second side of the distal end of the port; and
    the first biasing member and the second biasing member are configured to contact opposing sides of the pluggable transceiver module.

10. The receptacle connector according to claim 6, wherein:
    the receptacle connector further comprises a base plate having a plurality of apertures through which prongs of the cage are positioned to form an electrical connection with the substrate;
    the at least one biasing member is formed integral with the base plate; and
    the at least one biasing member extends vertically from the base plate.

11. The receptacle connector according to claim 6, wherein the receptacle connector further comprises a plug module stop configured to limit reverse translation of the pluggable transceiver module relative to the receptacle connector.

12. The receptacle connector according to claim 11, wherein the plug module stop comprises a cage latch formed integral with the cage, the cage latch configured to engage a housing of the plug connector to limit the reverse translation of the pluggable transceiver module when a force is imposed by the pluggable transceiver by the at least one biasing member.

13. The receptacle connector according to claim 6, wherein the receptacle connector further comprises a projecting element that is substantially rigid, the projecting element extending from a forward face of the pluggable transceiver module, the projecting element configured to contact an opposing portion of a housing of the connector.

14. The receptacle connector according to claim 13, wherein:
    the projecting element comprises a stepped body comprising a first surface and a second surface on differing vertical planes, the first surface and the second surface being separated by a sloped extending portion;
    the first surface and the second surface are generally flat with respect to and parallel with a top surface of a substrate on which the receptacle connector is disposed; and
    the projecting element is integral with the housing of the pluggable transceiver module.

15. The receptacle connector according to claim 6, further comprising:
    a first sidewall projection positioned on a first interior wall of the cage and a second sidewall projection positioned on a second interior wall of the cage opposite that of the first interior wall, the first sidewall projection and the second sidewall projection configured to contact a portion of the pluggable transceiver module to limit further translation of the pluggable transceiver module in the port.

16. The receptacle connector according to claim 15, wherein the first sidewall projection and the second sidewall projection are semi-circular punchouts formed on the first and second interior walls of the cage.

17. A connector assembly, comprising:
a receptacle connector configured to mount to a substrate and form an electrical connection therewith, the receptacle connector comprising a cage that defines a port, the port comprising a first biasing member and a second biasing member positioned therein formed integral with a bottom wall of the cage, and a connector comprising at least one terminal with a contact portion, wherein each of the first biasing member and the second biasing member are S-shaped and comprises a first C-shaped section extending in an insertion direction and a second C-shaped section integral with the first C-shaped section extending in an opposing direction; and
a plug connector comprising a pluggable transceiver module configured to be inserted into the port, the pluggable transceiver module comprising circuitry with at least one contact pad configured to engage with the contact portion of the at least one terminal,
wherein the first biasing member and the second biasing member are positioned at an end of an expected plug module travel range and are configured to urge the pluggable transceiver module to a predetermined position such that a stub length of the at least one contact pad has a predetermined length.

18. The connector assembly according to claim 17, wherein:
the first biasing member is positioned on a first side of a distal end of the port and the second biasing member is positioned on a second side of the distal end of the port; and
the first biasing member and the second biasing member are configured to contact opposing sides of the pluggable transceiver module.

19. The connector assembly according to claim 17, further comprising:
a first sidewall projection positioned on a first interior wall of the cage and a second sidewall projection positioned on a second interior wall of the cage opposite that of the first interior wall, the first sidewall projection and the second sidewall projection configured to contact a portion of the pluggable transceiver module to limit further translation of the pluggable transceiver module in the port.

20. The connector assembly according to claim 19, wherein the first sidewall projection and the second sidewall projection are semi-circular punchouts formed on the first and second interior walls of the cage.

\* \* \* \* \*